United States Patent [19]
Fuessel et al.

[11] Patent Number: 6,037,109
[45] Date of Patent: Mar. 14, 2000

[54] DEVICE AND METHOD FOR REPRODUCING ORIGINALS ONTO LIGHT-SENSITIVE MATERIAL

[75] Inventors: Markus Fuessel; Friedrich Jacob, both of Munich; Manfred Fuersich, Taufkirchen; Gudrun Taresch, Munich, all of Germany

[73] Assignee: AGFA-Gevaert Aktiengesellschaft AG, Leverkusen, Germany

[21] Appl. No.: 09/394,650

[22] Filed: Sep. 13, 1999

[30] Foreign Application Priority Data

Sep. 15, 1998 [DE] Germany .......................... 198 42 215

[51] Int. Cl.⁷ ...................................................... G03C 7/30
[52] U.S. Cl. .............................................. 430/359; 430/362
[58] Field of Search .................................... 430/359, 362

[56] References Cited

U.S. PATENT DOCUMENTS

| | | | |
|---|---|---|---|
| 4,942,462 | 7/1990 | Shiota | 358/76 |
| 5,698,379 | 12/1997 | Bohan et al. | 430/362 |
| 5,796,874 | 8/1998 | Woolfe et al. | 430/359 |
| 5,804,356 | 9/1998 | Cole et al. | 430/359 |
| 5,840,470 | 11/1998 | Bohan et al. | 430/359 |
| 5,959,722 | 9/1999 | Fussel et al. | 355/64 |

FOREIGN PATENT DOCUMENTS

| | | |
|---|---|---|
| 0472493 | 2/1992 | European Pat. Off. . |
| 0762736 | 3/1997 | European Pat. Off. . |
| 3824096 | 1/1989 | Germany . |
| 4004948 | 8/1991 | Germany . |
| 4040498 | 6/1992 | Germany . |
| 4103995 | 8/1992 | Germany . |
| 4309879 | 10/1993 | Germany . |
| 4236568 | 5/1994 | Germany . |
| 19634148 | 8/1996 | Germany . |
| 19536584 | 4/1997 | Germany . |

*Primary Examiner*—Hoa Van Le
*Attorney, Agent, or Firm*—Milde, Hoffberg & Macklin, LLP

[57] ABSTRACT

A method and a device for reproducing originals onto light-sensitive materials is described where unsharp masks for changing the reproduction process or the density values to be reproduced are determined from the density values of the original and from pre-specified gradation factors. Several different gradation factors are used to determine the mask of an original.

22 Claims, 2 Drawing Sheets

DEVICE AND METHOD FOR REPRODUCING ORIGINALS ONTO LIGHT-SENSITIVE MATERIAL

BACKGROUND OF THE INVENTION

The invention relates to a method as well as a device for reproducing originals, such as photographic negatives, onto light-sensitive material such as photographic printing paper.

The exposure range of negative film and of CCDs of digital cameras is significantly greater than that of photographic paper. For this reason, it is very problematic to reproduce subjects rich in contrast and with great differences in brightness as a good print on photographic paper. While such subjects with very bright and very dark areas are captured by the negative film or the digital camera, on the paper print they are either underexposed in the bright areas or overexposed in the dark areas. It is then very difficult or impossible to recognize individual details in the underexposed or overexposed areas of the paper picture.

To improve the paper image quality of such contrast-rich pictures during photographic printing it is known to use masks to reduce the contrast when making prints.

For example, in the published German Patent application No. DE-OS 40 40 498 it is recommended to insert a mask that reproduces a very unsharp inverse projection of the original into the exposure light path of the negative during the printing process. This reduces the large area contrast in the print or copy while the contrast in the details remains unchanged.

The German Patent No. DE-PS 196 34 148 describes how the image original, the exposure apparatus and the mask can be attuned to one another and to the various printers. To compute the mask, an unsharp luminance image is created from the values $y_{l,m}$ of the luminance image stored in a two-dimensional matrix.

$$y''_{l,m} = \frac{1}{(2n+1)^2} \sum_{k1=l-n}^{k1=l+n} \sum_{k2=m-n}^{k2=m+n} y_{k1,k2}$$

Here, n is the number of points of the luminance image to be used for averaging. This unsharp image is now inverted and normalized, such that the final image points $y'''_{l,m}$ for the mask are computed according to the equation:

$$y'''_{l,m} = 255 \left( \frac{y''_d}{y''_{l,m}} \right)^\gamma$$

taking into account the gradation. In this equation, $y''_d$ stands for the value of the darkest image point of the unsharp luminance image and λ for the gradation factor.

In a digital copying process, the mask is computed together with the luminance image such that the corrected image points of the luminance image are the result of $$y^{iv}_{l,m} = \left( y_{l,m} \left( \frac{255}{y''_{l,m}} \right) \right)^\gamma$$

The mask changes the printed image such that, for example, a dark area in a light surrounding is brightened such that the patterns in the dark area become more visible. In this manner, the image information, for example in the area of the direct shadows falling onto bright faces, is brightened such that the areas of the faces located in the shade can be clearly recognized. The gradation factor λ is responsible for the degree of brightening, or more general, for the strength of the mask—that is, the degree of reduction of the large area contrast—of the contrast between two large areas of different brightnesses.

The German Patent No. DE-PS 196 34 148 suggests to determine whether masking should be used based on the density volume of the original. Once a decision for masking has been made, each image is overlaid with a mask with a pre-determined, computed gradation factor. The same gradation factor λ=0.5 that has been proven as advantageous is used for all images.

It has been found that the method described in the aforementioned German Patent No. DE-PS 198 34 148 leads to excellent picture results with some originals, however, with other originals the result is not satisfactory. For example, it has been noticed that the image impression is significantly worsened in comparison to unmasked prints, if black spots, that is, spots in the negative that are not exposed and that contain no image information, are brightened during printing exposure. The color tipping of the film can cause the completely black areas of the original to appear in the print as disturbing structure-less areas in gray, green or brown. For example, it may be disadvantageous to the image result if pictures are masked where the effect is created by the contrast between bright and dark—for example a frame of a picture showing a black cat in front of white wall. In the print, the cat would appear gray if the image were masked according to the method described.

SUMMARY OF THE INVENTION

It is, therefore, a principal object of the invention to develop a method for masking photographic image originals where all important contents of the image are reproduced optimally in the photographic print.

This object, as well as other objects which will become apparent from the discussion that follows, are achieved, in accordance with the present invention, by utilizing a plurality of different gradation factors to determine the mask of the original.

Both for the analog copying process where a mask is used for reducing the amount of light used during the exposure of the negative in order to reduce the large area contrast in the print, and for the digital copying process where the digital mask is directly computed in the image data for the same purpose, it is recommended according to the invention to use several differing, predetermined gradation factors λ for computing the mask for an original. The gradation factors that determine the strength of the masking can be either determined anew prior to each image, or for one order, or can be preset permanently for a printer. By using different gradation factors to compute the mask for an original, it is possible to mask different areas of an image differently. For areas of the picture where the reproduction of the content will be improved by strong masking, a large λ can be selected, while according to the invention a small λ can be selected for areas where during the copying process the content would be falsified through strong masking. The large area contrast of the image is strongly reduced in areas where a large gradation factor λ is selected, while it remains almost unchanged in other areas by selecting a small gradation factor. This allows for optimum reproduction of an image where areas that are covered by shadows are brightened while at the same time intentional dark areas—such as a black cat—remain black because they are masked relatively little.

The invention cannot only be applied to conventional printers where a transparent original is printed directly through a light source onto light-sensitive material (photographic paper) but also to digital printers. With digital printers, an original is either scanned electronically, digitized and processed or an already stored digital original is processed and using a digital exposure device is printed onto the light-sensitive material. With a digital printer, the mask is computed with the image data before it is exposed onto the paper using a pixel controlled light valve—such as an LCD, a DMD or LEDs—or a laser or CRT beam that is guided over the paper or any other digitally controllable light source.

It has proven to be advantageous, for images that are printed unsatisfactorily with conventional methods, to select different gradation factors for different density values of the original. To this end, the density values of the original are divided into n density value intervals and a gradation factor is assigned to each density value interval. There can be any number of density value intervals with any desired size. Oftentimes, two intervals may already lead to optimum results. The gradation factors assigned to the density value intervals may all be different but do not have to be.

The gradation factor may be a constant factor for each interval but may also be any function of the density values.

The interval borders and the gradation factors belonging to the intervals may be pre-specified in various manners. One possibility is to have the operation personnel set these parameters. In such a case, they are selected based on the image impression and personal taste of the operator. One can imagine this procedure particularly for digital printers. The density values of the original would be computed with a mask that has been determined based on parameters that have been specified by the operator. Thereafter, the masked image is displayed on a monitor in order to determine whether the image should be printed as is or whether different parameters should be selected. In this process, the operator may be free to choose all parameters, or, for example, the interval borders may be specified while the operator can enter the associated gradation factors. In this manner, it is possible for the operator to determine how strong bright or dark areas of the image should be masked depending on his taste.

An additional possibility to specify the interval borders and gradation factors is to determine these parameters already during printer manufacturing. This option has the advantage that the parameters can be optimized through a series of prints where images are masked with varying masks and where the operator is not burdened with setting the parameters.

However, it is also possible to combine these two options. Specified parameters may already be integrated in the printer; however, the possibility may be available to alter these parameters by the operator.

It has proven to be advantageous to specify different sets of interval borders and/or gradation factors for different types of images. For example, pictures taken with a flash are masked with other parameters than landscape pictures. The artificial lighting conditions of flash photography can be better corrected in this manner.

An additional possibility is to derive the interval borders and/or the gradation factors from the density values of the original. The parameters can be linked to the mean density of the original, to the minimum or maximum density of the original, to the ratio of minimum to maximum density or to any other density. It is particularly advantageous to orient the masking parameters on the density of the image-important area. Image important areas that are recognized by the copying logics may be facial areas in a picture taken with a flash or the dark foreground in a backlit picture. Since these areas dominate the image, it is of particular importance to present them optimally in the copy, which is ensured by optimizing the degree of masking for these areas. If the density of image-important areas in the negative is close to the film mask, or in the digital image below a minimum value, it points to an underexposed picture. In such a case, the gradation factors for the mask in the image-important areas should be selected very small or even negative. Other options for selecting the parameters based on the density are imaginable as well.

In handling the masking in this manner, it is possible to mask underexposed images with a low mean density completely differently than normal or overexposed images. It can thus be avoided to darken underexposed images even further.

It is also possible to make the parameters of interval borders and gradation factors dependent on the frequency of the density values of the original because it is advantageous to mask those intervals stronger whose density values occur rarely in the original. This accomplishes that such density value intervals that carry practically no image information have only a very low density range in the print, that is, encompass only a few different gray levels. Since the density range of the photographic paper is limited, it is always desirable to link as few gray levels as possible to image-unimportant areas.

On the other hand, with a rather balanced frequency distribution of the density values, it is advantageous to select the gradation factors that with a transparent negative original belong to the intervals or lower density values smaller than the gradation factors that belong to the intervals of higher density values. It is the opposite with positive originals. The result is that darker image areas in the copy are generally masked less strongly than brighter image areas. This ensures that black cats can remain black in the picture while weak shadows in bright areas can be brightened even more.

This process is particularly advantageous when the lowest density values of the transparent negative original are very close to the film mask as is the case with the negative of the picture of the black cat. In this case, it is advantageous to set the gradation factor that belongs to the interval of the smallest density values, that is, to the cat, to zero such that this area is not masked strongly. Another possibility is to select a negative gradation factor in this density value interval. This results in an inverse masking, that is, an increase in large area contrast; in the copy, the black cat would then appear more black in comparison to the surrounding area such that the contrast would have an even stronger effect in the copy.

With some types of originals, it is advantageous to select different gradation factors for different local areas of the original. For example, a different masking strength may be advantageous in the center of the original, where the image-important components are generally located, rather than on the edges of the picture. For example, with underexposed images, the center of the picture could be masked negatively, that is, the contrast could be raised, while the edges of the picture are not masked at all for the entire effect of the picture to be more natural.

Of course, selecting different gradation factors according to the position in the picture can also be combined with the selection of the gradation factor according to the various density values.

If a different mask is generated for each color, each of these color masks can, of course, be computed with different gradation factors. In this manner, each color in the copy could be brightened or intensified differently, depending on the content of the picture. For example, a blue sky could receive a deeper blue, while an object with the same blue color at a different location in the picture could be rendered in an unadulterated manner.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
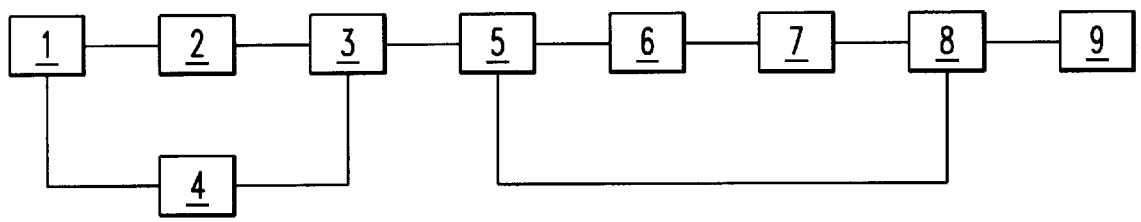
FIG. 1 shows a schematic sequence of a digital printing process.

The preferred embodiments of the present invention will now be described with reference to FIGS. 1–4 of the drawings. Identical elements in the various figures are designated with the same reference numerals.

FIG. 1 illustrates a digital printing process where the digital original is overlaid with an unsharp mask. The digital original is entered into the original memory 1 either by scanning a transparent negative original or as a digital original from the Internet or any other storage medium. In general, 3 colors and 256 brightness levels are assigned to each point in the original. To avoid undefined expressions at subsequent computation operations, the value 0 is raised to the value 1, leaving 255 gray levels for each point. The R, G, B signals read from the original memory 1 are converted into chrominance signals V, U and a luminance signal Y in a converter 2 and then saved in a memory 3. The signals are processed in the image-processing unit 4. Here, the original is improved through image focusing or error elimination, or altered based on image type recognition. The processed values are again saved as chrominance signals and luminance signals in memory 3. Digital image processing can just as well be carried out after masking of the picture. However, the contrasts in the picture are then not as strong such that the differentiation of the image types might become more difficult for the logic. Based on the luminance image, a decision is made in a computing unit 5 whether the original to be copied is to be masked. A possible decision process is described in the aforementioned German Patent No. DE-PS 196 34 148. If it was decided that the image is to be masked, an unsharp rough mask is generated in the computing unit 5 by averaging, using the following equation:

$$y''_{l,m} = \frac{1}{(2n+1)^2} \sum_{k1=l-n}^{k1=l+n} \sum_{k2=m-n}^{k2=m+n} y_{k1,k2}$$

The now present values y" are written into the memory 6. The rough mask is inverted in another computing unit 7, normalized and computed with the gradation factor. In principle, this process corresponds to that described in the German Patent No. DE-PS 196 34 148 as well. The mask is determined from the equation:

$$y'''_{l,m} = 255 \left(\frac{y''_d}{y''_{l,m}}\right)^\gamma$$

with the luminance value $y''_d$ of the darkest point of the original for a scanned in transparent negative original or the brightest point of the original for a digital positive original and the gradation factor $\lambda$. However, the equation must be expanded—as described below—because according to the invention the density values of an original must be divided into n density value intervals $I_{i=l,n}$ each with a gradation factor $\lambda_i$ to calculate the mask.

In accordance with the aforementioned German Patent No. DE-PS 196 34 148, beginning with the normalization that the luminance value $y''_d$ belonging to the interval $I_n$ shall not be masked, the mask in the interval $I_n$ results from:

$$y'''_{l,m} = \left(\frac{y''_d}{y''_{l,m}}\right)^\gamma.$$

To simplify the matter, tile lumuinance values $y'''_{l,m}$ of the mask are converted into densities through logarithms $$d_{l,m}^M = \lg(y'''_{l,m}) = \lambda_n(d_{max}^{neg} - d_{l,m}^{neg})$$

where $d^{neg}_{max}$ is the density of the most dense point in the negative and thus at the same time the limit density $d^{neg}_n$ of the n-th density value interval.

For the negative densities in the following density value interval $I_{n-1}$ the mask densities are derived according to:

$$d_{l,m}^M = \lambda_n(d_{max}^{neg} - d_{n-1}^{neg}) + \lambda_{n-1}(d_{n-1}^{neg} - d_{l,m}^{neg})$$

For the negative densities in the i-th density value interval $I_{i \neq n}$, the mask densities are derived as follows:

$$d_{l,m}^M(d_{l,m}^{neg}) = \gamma_i(d_i^{neg} - d_{l,m}^{neg}) + \sum_{k=0}^{n-(i+1)} \gamma_{n-k}(d_{n-k}^{neg} - d_{n-k-1}^{neg}).$$

Figure 2:
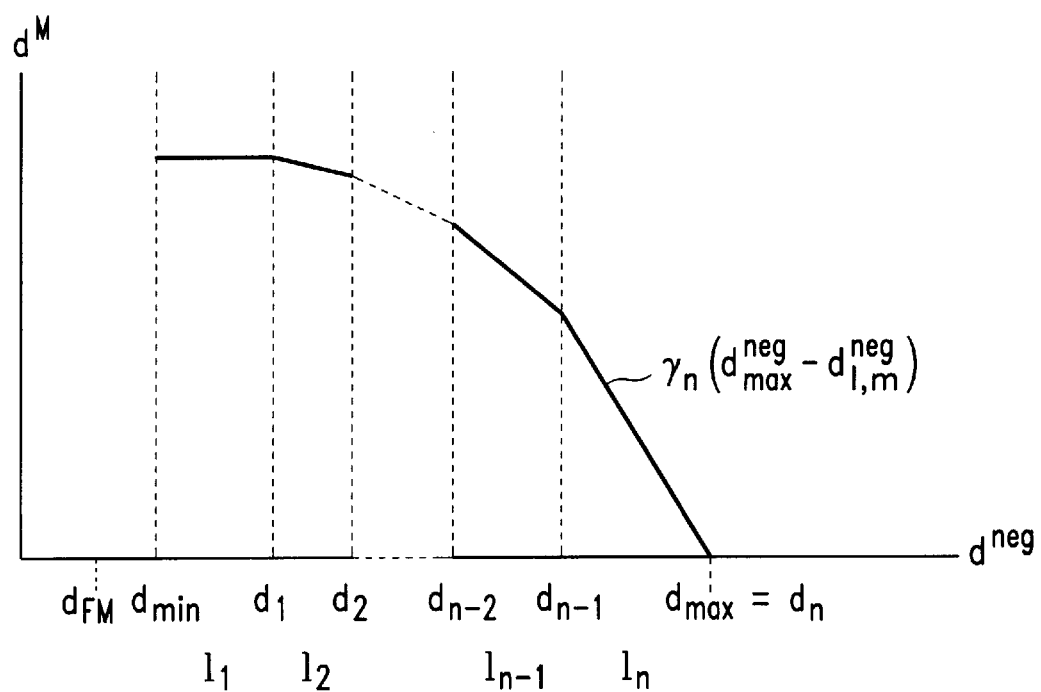
FIG. 2 is a graphical display for determining the mask density.

This process of determining the density values for the masks is presented graphically in FIG. 2. There, the density of the mask is expressed as a function of the negative density. According to the normalization, there is no masking at the maximum density of the negative that leads to the brightest point in the print, that is, $d^M(dn)=0$. The masking density at a point of the last interval is obtained from the product of the ramp $\lambda_n$ with the difference from maximum density and the density of the point to be computed. In the next interval, the product of a new $\lambda_{n-1}$ with the difference from the density of the interval border and the density of the point to be masked is again added to the maximum mask density of the previous interval. This process continues to the minimal density of the original. The minimal density $D_{min}$ is the smallest density that occurs in the original. If this density is close to the density of the film mask $D_{FM}$, the ramp, and thus the gradation factor $\lambda_1$ in the density value interval $\lambda_1$ is zero.

Now, the density values of the mask are again converted into luminance values in the computing unit 7, such that they can be computed together with the luminance values of the original and the result can be saved in the image memory 8.

The chrominance signals V and U arrive at this image memory as well. If it is determined at the computing unit 5 that there is to be no masking, these three signals are transferred directly from the computing unit 5 into the image memory 8. In a converter 9, these R, G, B signals are again transformed. It is also possible to forgo converting the R, G, B values into luminance and chrominance values at the beginning of the process, to derive the mask directly from the R, G, B values of the image and to compute the mask values then with the R, G, B image data. A digital printer can now be controlled with the resulting values.

Figure 3:
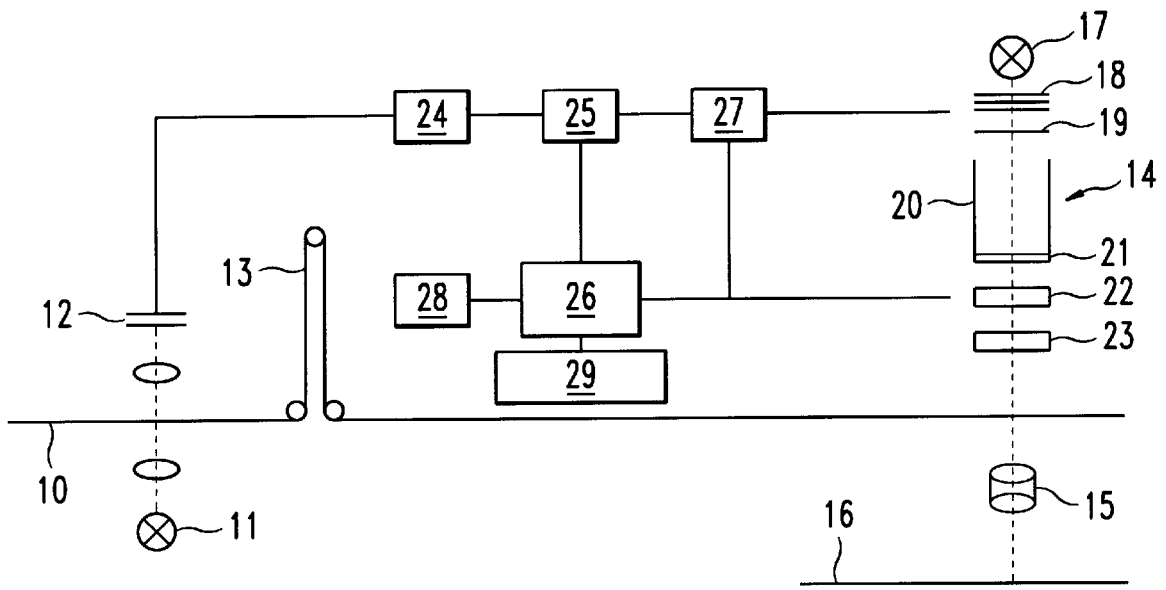
FIG. 3 shows the schematic structure of a conventional printing process.

FIG. 3 shows a photographic printing unit that operates in conventional manner with direct or integral exposure. The film 10 being transported from left to right first runs through the scanner with the light source 11 and the sensor 12. This sensor can be designed as a CCD area sensor or preferably as a line sensor. However, in contrast to the digital printer of FIG. 1, this scanner requires a much lower resolution in a range of, for example, 400×600 pixels per negative. After the scanner, the film runs into a decoupling loop 13, which ensures that at least a large portion of the film is scanned before the first pixel image of the film is copied. In addition, the loop shall—when using a line scanner—decouple the intermittent movement of the film through the printing station 14 from the continuous movement through the scanner.

The individual frames of the film 10 are exposed onto the photographic paper 16 via the objective 15 in the printing station 14. The exposure is carried out via the lamp 17, the color filter unit 18, the shutter 19, the reflective well 20 with the diffusing disk 21 at the exit opening of the reflective well, the LCD display 22 and the diffusing disk 23. An unsharp mask, which this time is overlaid in optical manner over the images with a too large area contrast, is again generated in the LCD display 22. Computation of the mask occurs in an analog manner according to the method described in FIG. 1. In FIG. 3, the procedures 1 to 3 of FIG. 1—that is, up to saving the luminance image and the two chrominance images—are combined under the reference number 24. The reference number 25 stands for the process 5; that is, the decision whether or not to mask. The mask is computed, inverted, normalized and the gradation is determined in 26, corresponding to the procedures 6 to 8 in FIG. 1. To compute the mask, several sets of density value intervals and gradation factors are stored in the look-up-table (LUT) 28. In addition, interval limits and/or gradation factors can be entered by the operator at the input unit 29. A mask computed with these parameters is overlaid over the image and displayed on a monitor not shown in the drawings so that the personnel can check the selection of the parameters. New parameters can be entered into the input unit 29 if the operating personnel are not satisfied with the result. Then, a final mask is computed using the final parameters—possibly in connection with the parameters from the LUT. The mask calculated in this manner is displayed on the LCD display 22. The color filter unit 18 and the shutter 19 are then controlled via the exposure-computing device 27 in the known manner under consideration of the masking values.

Figure 4:
FIG. 4 is a graphical display for determining the gradation factor from the frequency distribution of the density values.

FIG. 4 shows an alternative method for determining the gradation factors for a mask. Here, the basis is the frequency distribution H(d) of the density values of the original. For masking, a very small $\lambda$ that is far below the mean $\lambda_0$ is assigned to the densities in the interval $I_3$ that occur most frequently in the original. A very large $\lambda$ is assigned to the densities in the interval $I_5$ that occur least frequently in the original. In the interval $I_4$ that is located in between, the $\lambda$ increases continuously, such that no jump occurs in the mask that is subsequently computed using the $\lambda$ determined in this process.

There has thus been shown and described a novel device and method for reproducing originals onto light-sensitive material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method for reproducing originals onto light-sensitive materials where unsharp masks for changing the reproduction process or the density values to be reproduced are determined from the density values of an original and from pre-specified gradation factors, the improvement wherein a plurality of different gradation factors are used to determine the mask of an original.

2. Method as set forth in claim 1, wherein the mask is a gray mask.

3. Method as set forth in claim 1, wherein the mask is a color mask.

4. Method as set forth in claim 1, wherein the transparent originals are scanned, exposure data sets are computed and the originals are projected directly onto the light-sensitive material.

5. Method as set forth in claim 1, wherein the image of a transparent original is digitized, the digital image is temporarily stored, and the digital image is reproduced onto the light-sensitive material.

6. Method as set forth in claim 1, wherein digital original images are reproduced onto the light-sensitive material.

7. Method as set forth in claim 1, wherein different gradation factors are selected for different density values of an original.

8. Method as set forth in claim 7, wherein the density values of the original are divided into n density intervals $I_{i=1,n}$ where a gradation factor $\lambda_i$ is assigned to each interval $I_i$.

9. Method as set forth in claim 8, wherein at least one of the interval borders $d_{i(o<i<n)}$ and the corresponding gradation factors $\lambda_i$ are set according to the image impression.

10. Method as set forth in claim 8, wherein at least one of the interval borders $d_{i(o<i<n)}$ and the corresponding gradation factors $\lambda_i$ are specified in a fixed manner.

11. Method as set forth in claim 10, wherein a plurality of sets of interval borders and gradation factors are specified for different types of images.

12. Method as set forth in claim 8, wherein the interval borders and gradation factors are selected according to the density values of the original.

13. Method as set forth in claim 12, wherein interval borders and gradation factors are selected according to the mean density of the original.

14. Method as set forth in claim 12, wherein the interval borders and gradation factors are selected according to at least one of the minimum and maximum density values of the original.

15. Method as set forth in claim 12, wherein the interval borders and gradation factors are selected according to the mean density of the image important area.

16. Method as set forth in claim 12, wherein the interval borders and gradation factors are selected according to the frequency distribution of the density values.

17. Method as set forth in claim 16, wherein the gradation factors $\lambda_i$ are selected absolutely greater for intervals whose density values occur rarely in the original.

18. Method as set forth in claim 12, wherein the gradation factor $\lambda_i$ of the interval with the density values leading to the darkest points in the copy is smaller than the gradation factor $\lambda_i$ that belongs to an interval of such density values that lead to bright points in the copy.

19. Method as set forth in claim 18, wherein the gradation factor $\lambda_i$ is selected according to the difference between the minimum density of the original of a transparent original and the film mask or between the maximum density of a digital positive original and a maximum density that can be reproduced.

20. Method as set forth in claim 19, wherein a gradation factor is $\lambda_i<0.2$ when the difference is smaller than a threshold level $d_s$.

21. Method as set forth in claim 19, wherein the gradation factor $\lambda_i$ is negative when the difference is smaller than a threshold level $d_s$.

22. Method as set forth in claim 1, wherein different gradation factors are selected for locally different areas of an original.

* * * * *